US009639256B2

(12) United States Patent
Zhu et al.

(10) Patent No.: US 9,639,256 B2
(45) Date of Patent: May 2, 2017

(54) METHOD FOR STARTING ACTIVITY OF MOBILE TERMINAL AND THE MOBILE TERMINAL

(71) Applicants: HISENSE MOBILE COMMUNICATIONS TECHNOLOGY CO., LTD., Qingdao, Shandong (CN); HISENSE USA CORPORATION, Suwanee, GA (US)

(72) Inventors: Pingyang Zhu, Shandong (CN); Xin Zhang, Shandong (CN); Guochen Sun, Shandong (CN); Jiufa Huang, Shandong (CN)

(73) Assignees: HISENSE MOBILE COMMUNICATIONS TECHNOLOGY CO., LTD., Qingdao, Shandong (CN); HISENSE USA CORPORATION, Suwanee, GA (US)

( * ) Notice: Subject to any disclaimer, the term of this patent is extended or adjusted under 35 U.S.C. 154(b) by 321 days.

(21) Appl. No.: 14/460,151

(22) Filed: Aug. 14, 2014

(65) Prior Publication Data

US 2015/0121303 A1 Apr. 30, 2015

(30) Foreign Application Priority Data

Oct. 31, 2013 (CN) .......................... 2013 1 0533246

(51) Int. Cl.
*G06F 3/0484* (2013.01)
*G06F 9/44* (2006.01)
*G06F 3/048* (2013.01)
*G06F 9/54* (2006.01)

(52) U.S. Cl.
CPC .......... *G06F 3/04847* (2013.01); *G06F 3/048* (2013.01); *G06F 9/4443* (2013.01); *G06F 9/542* (2013.01)

(58) Field of Classification Search
CPC .................................................. G06F 3/04847
See application file for complete search history.

(56) References Cited

U.S. PATENT DOCUMENTS

| 2007/0016867 A1* | 1/2007 | Nickell ................. G06F 9/4443 715/730 |
| 2010/0081475 A1 | 4/2010 | Chiang-Liang et al. |
| 2010/0095240 A1* | 4/2010 | Shiplacoff ............. G06F 3/0483 715/784 |

FOREIGN PATENT DOCUMENTS

CN 101686280 3/2010

OTHER PUBLICATIONS

EP 14189473.3—1954, European Search Report dated Feb. 9, 2015, 7 pages.

* cited by examiner

*Primary Examiner* — Peiyong Weng
(74) *Attorney, Agent, or Firm* — Boyle Fredrickson, S.C.

(57) ABSTRACT

Some embodiments of the application provide a method for starting an Activity of a mobile terminal and the mobile terminal. The method may comprise: determining a display mode of a new Activity after determining that the new Activity is required to be started; and setting a window flag for starting the Activity according to the determined display mode so as to start the Activity in the display mode indicated by the window flag; where the display mode comprises a window mode and a full-screen mode.

13 Claims, 6 Drawing Sheets

Figure 1:
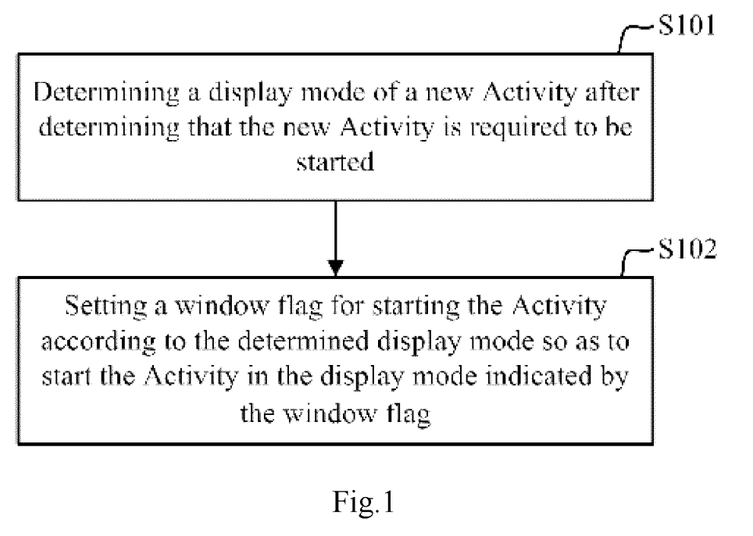

METHOD FOR STARTING ACTIVITY OF MOBILE TERMINAL AND THE MOBILE TERMINAL

CROSS-REFERENCES TO RELATED APPLICATIONS

The present application claims priority from Chinese Patent Application No. 201310533246.0, filed with the Chinese Patent Office on Oct. 31, 2013 and entitled "Method and Device for Starting Activity in Android Platform", which is hereby incorporated by reference in its entirety.

FIELD

The disclosure relates to the technical field of communications, and in particular to a method for starting an Activity of a mobile terminal and the mobile terminal.

BACKGROUND

Mobile terminals (such as mobile phones, tablet computers and the like) based on various platforms (such as an Android platform, an IOS platform, a Symbian platform, a Windows Phone system, a Sailfish OS system, an Ubuntu Touch system or any other mobile operating systems and the like) are widely used. These mobile terminals generally display pages in a full-screen manner, that is, an opened application is displayed on the whole screen, and the window of the application spreads out on the full screen. The window of the latest opened application covers the window of the application opened previously, and spreads out on the full screen of the mobile terminal. A user may see the window of the application opened previously after closing the window of the latest opened application.

SUMMARY

In one aspect, an embodiment of the disclosure provides a method for starting an Activity of a mobile terminal, which includes:

determining a display mode of a new Activity after determining that the new Activity is required to be started; and setting a window flag for starting the Activity according to the determined display mode so as to start the Activity in the display mode indicated by the window flag;

where the display mode comprises a window mode and a full-screen mode.

In another aspect, an embodiment of the disclosure provides a mobile terminal, which includes:

a memory; and one or more processors, where the memory stores computer-readable program codes, and the one or more processors are used to execute the computer-readable program codes to implement:

determining a display mode of a new Activity after determining that the new Activity is required to be started; and setting a window flag for starting the Activity according to the determined display mode so as to start the Activity in the display mode indicated by the window flag;

where the display mode comprises a window mode and a full-screen mode.

In another aspect, an embodiment of the disclosure provides a storage medium storing computer-readable program codes, which may be executed by one or more processors to implement:

determining a display mode of a new Activity after determining that the new Activity is required to be started; and setting a window flag for starting the Activity according to the determined display mode so as to start the Activity in the display mode indicated by the window flag;

where the display mode comprises a window mode and a full-screen mode.

BRIEF DESCRIPTION OF THE DRAWINGS

FIG. 1 shows a flow schematic diagram of a method for starting an Activity of a mobile terminal according to an embodiment of the disclosure;

FIG. 2 shows an example of a method of determining the display mode of the Activity;

FIG. 3 shows an example of a method of determining the window open mode and setting the window flag;

FIG. 4 shows an example of a method of displaying the window according to the window flag and window attribute data;

FIG. 5 shows a structural schematic diagram of a mobile terminal according to an embodiment of the disclosure; and FIG. 6 shows a structural schematic diagram of an Android terminal according to an embodiment of the disclosure.

DETAILED DESCRIPTION OF CERTAIN PREFERRED EMBODIMENTS

Embodiments of the disclosure provide a method for starting an Activity of a mobile terminal and the mobile terminal. In the method, after it is determined that a new Activity is required to be started, a display mode of the Activity is determined; and a window flag for starting the Activity is set according to the determined display mode so that the Activity is started in the display mode indicated by the window flag. Since an application comprises one or more Activities, the starting of the Activity means the starting of the application. At least one aspect of the embodiments of the disclosure provides a method for setting an open mode of an application flexibly.

It needs to be noted that some embodiments of the disclosure are described below to illustrate some solutions of the disclosure, but these embodiments are only parts of embodiments of the disclosure and not all of the embodiments. The protection scope of the disclosure should not be limited by the contents of these embodiments.

Taking a mobile terminal based on the Android platform as an example, one application comprises one or more Activities, where each Activity is responsible for displaying and processing one page. The modes for opening one application may at least comprise a window mode and a full-screen mode. When one application is started, one Activity of the application may be started firstly, where when the Activity is started in the window mode, the application is started in the window mode; and when the Activity is started in the full-screen mode, the application is started in the full-screen mode. It needs to be noted that a plurality of Activities of one application may be displayed in the same mode or in different modes. For example, when one application is started, the Activity opened firstly is displayed in the window mode, and other Activities, which are opened subsequently, of the application may be displayed in the window mode or in the full-screen mode.

FIG. 1 is a flow schematic diagram of a method for starting an Activity of a mobile terminal according to an embodiment of the disclosure. As shown in FIG. 1, the method may comprise the following steps:

Step S101: determining a display mode of a new Activity after determining that the new Activity is required to be started; and Step S102: setting a window flag for starting the Activity according to the determined display mode so as to start the Activity in the display mode indicated by the window flag.

In this case, the display mode may at least comprise the window mode and the full-screen mode.

For example, in the mobile terminal based on the Android platform, the starting of the Activity may rely on the intent. The intent is the abstract description of an action to be executed, and information of the Activity to be started is contained in the intent. When the intent is received by one Activity, how to start the Activity may be determined according to data in the intent. Optionally, in the step S101, determining the display mode of the Activity may comprise:

determining whether the display mode is preset for the Activity;

if the display mode is preset for the Activity and the preset display mode is the window mode, then determining that the display mode of the Activity is the window mode.

Optionally, the step of determining whether the display mode is preset for the Activity may comprise but not limited to the following two optional solutions:

First solution: determining whether a flag preDisFlag exists in the intent containing the information of the Activity, if so, determining that the display mode is preset for the Activity, and otherwise, determining that no display mode is preset for the Activity. Further, the display mode preset for the Activity may be determined according to a specific value of the preDisFlag, for example, when preDisFlag=1, the preset display mode is the window mode; when preDisFlag=0, the preset display mode is the full-screen mode.

Second solution: determining whether the flag preDisFlag exists in the intent containing the information of the Activity, if so, determining that the display mode is preset for the Activity and the preset display mode is the window mode, and otherwise, determining that no display mode is preset for the Activity and the display mode of the Activity is the full-screen mode.

Optionally, in the step S101, before determining that whether the display mode is preset for the Activity, the method may further comprise: determining whether the application to which the Activity belongs exists in a window blacklist winBlackList, if so, determining that the display mode of the Activity is the full-screen mode.

For example, after the mobile terminal is booted up, the application which is firstly started is generally a Launcher application, namely for starting a standby screen. The screen is an entrance of other applications, and the other applications may be started through this application, where this application may be put in the winBlackList to thereby start all the Activities of the application in the full-screen mode. In addition, some other applications may also be put in the winBlackList to thereby start these applications in the full-screen mode.

Optionally, after determining whether the display mode is preset for the Activity, the step S101 may further comprise:

if no display mode is preset for the Activity, then determining a value of current run mode indication information runMode; and determining the display mode of the Activity according to the value of the runMode.

Here, the runMode is used for indicating display modes of respective applications (i.e., starting modes of the applications) in runtime.

Optionally, the display mode of the Activity is determined to be the window mode when one of the following conditions is met:

first condition: the runMode indicates that the application designated by a user is started in the window mode (for example, runMode=3), and the application to which the Activity belongs is the application designated by the user;

second condition: the runMode indicates that all the applications are started in the window mode (for example, runMode=1);

third condition: the runMode indicates that the application to be started currently is started in the window mode (for example, runMode=2), and the application to which the Activity belongs is the application to be started currently.

Optionally, if the runMode indicates that the application designated by the user is started in the window mode and the application to which the Activity belongs is not the application designated by the user, then the display mode of the Activity is the full-screen mode;

If the runMode indicates that the application to be started currently is started in the window mode and the application to which the Activity belongs is not the application to be started currently, then the display mode of the Activity is determined to be the full screen mode; and If the runMode indicates that all the applications are started in the full-screen mode (for example: runMode=4), then the display mode of the Activity is determined to be the full-screen mode.

Optionally, it may be determined whether the application to which the Activity belongs is the application designated by the user through the following mode:

reading the value of the window flag winFlag in the intent corresponding to the Activity and determining whether the application to which the Activity belongs is the application designated by the user according to the value of the winFlag. For example, when the winFlag is equal to the preset winFlag0 (for example, winFlag0=−1), the application to which the Activity belongs is determined to be the application designated by the user; and otherwise, the application to which the Activity belongs is determined to be not the application designated by the user.

Optionally, if the runMode indicates that the application to be started currently is started in the window mode, then after determining the display mode of the Activity according to the current run mode indication information, the method may further comprise:

setting the runMode to indicate that the application designated by the user is started in the window mode.

In other embodiments, after the step S101 and before the step S102, the runMode is set to indicate that the application designated by the user is started in the window mode; or after the step S102, the runMode is set to indicate that the application designated by the user is started in the window mode, so that the runMode indicates that the application designated by the user is started in the window mode when the next Activity is to be started.

Here, it needs to be noted that, the condition of presetting the display mode is different from the condition of starting the application designated by the user in the window mode. The preset display mode is set in advance, is the attribute bound with the Activity, and may be set as the full-screen mode or the window mode; and however, the condition of starting the application designated by the user in the window mode is related to an operation designated by the user (for example, the designated operation is to open a certain Activity in the preset display mode). For example, the user designates that a certain application is required to be started in the window mode through the operation on the terminal interface, and then the application is started in the window mode.

The following example will describe some flows for determining the display mode of the Activity.

The method for determining the display mode of the Activity in the step S101 has been described above, and the method for setting the window flag for starting the Activity in the step S102 will be described below.

If the determined display mode is the full-screen mode, then the window flag winFlag for starting the Activity is set to be a preset winFlag1, where the winFlag1 is a preset window flag representing that Activity is started in the full-screen mode, for example, the winFlag1 may be set to be 0.

If the determined display mode is the window mode, then after the display mode of the Activity is determined and before the window flag is set, the method may further comprise: determining whether a new window is required to be opened when the Activity is started, if so, assigning the winFlag corresponding to the new window to the Activity, and otherwise, setting the window flag to be the winFlag corresponding to an opened window.

For the Activity of which the display mode is the window mode, the winFlag thereof meets: the winFlag is in one-to-one correspondence with the single window and not equal to the winFlag1 (at this time, the winFlag1 representing that the display mode is the full-screen mode).

Here, each window corresponds to the unique winFlag, the winFlag is used for identifying the corresponding window, one window may correspond to one or more Activities, and each Activity corresponding to the window is required to record the winFlag.

Optionally, the step of determining whether the new window is required to be opened when the Activity is started may comprise:

determining window open mode indication information startMode, where the startMode is used for indicating different modes for opening the window.

Specifically, the new window is determined to be opened when one of the following conditions is met:

first condition: the startMode indicates that the window is opened by taking an Activity as the unit;

second condition: the startMode indicates that the window is opened by taking an application as the unit, and the application to which the Activity belongs is a newly started application.

In addition, if the startMode indicates that the window is opened by taking a user operation as the unit, then it is determined that the opened window is used when the Activity is started; and at this time, the winFlag corresponding to the Activity is set to be the winFlag corresponding to the window where the user operation for starting the Activity is located.

If the startMode indicates that the window is opened by taking an application as the unit and the application to which the Activity belongs is a started application, then it is determined that the opened window is used when the Activity is started; and at this time, the winFlag corresponding to the Activity is set to be the winFlag corresponding to the window used by the application to which the Activity belongs.

In the above solution, different startModes correspond to different window open modes. When the startMode indicates that the window is opened by taking an application as the unit, one application corresponds to one window, and all the Activities of the application correspond to the same window. When the startMode indicates that the window is opened by taking a user operation as the unit, respective Activities started by all the user operations in one window correspond to the window (for example, all the applications opened in one window correspond to the window), and at this time, since the respective Activities may belong to different applications, several applications may correspond to one window in this mode. When the startMode indicates that the window is opened by taking an Activity as the unit, a new window is opened correspondingly every time a new Activity is started, and since an Activity is the unit smaller than an application, one application may correspond to multiple windows in this mode.

Optionally, in an implementation, a mode setting item may be added for the startMode, where the mode setting item may be set by the user and not be lost when the mobile terminal is powered off, the mode setting item may be automatically read out by a software program when the terminal is booted up, and the open mode of the window is determined according to the item.

The method for determining different modes for opening the window according to the startMode and setting the corresponding winFlag will be described below in details.

The method for determining the different modes for opening the window according to the startMode and setting the corresponding winFlag has been described above, and the method of notifying the Activity how to display the window will be introduced below.

Optionally, after the display mode of the Activity is determined to be the window mode, the method according to some embodiments of the disclosure may further comprise:

setting window attribute data for starting the Activity to enable the Activity to display the window according to the window attribute data.

The window attribute data may comprise one or more of the following parameters: left position of window, top position of window, window width, window height, whether to maximize and the like. It needs to be noted that, the parameters included in the window attribute data are not limited to the examples described above as long as the Activity may determine the display window according to the data. For example, the window width and the window height may not be defined, but the left position of the window, the right position of the window, the top position of the window and the bottom position of the window are defined respectively, so that the window position and the window size of the window are determined through the data.

In some embodiments, the parameters included in the window attribute data may be as shown in Table 1.

TABLE 1

| Window Attribute Data | | |
|---|---|---|
| Attribute Value | Attribute Name | Value Type |
| Left position of window | multiwinLeft | Integer (Int) |
| Top position of window | multiwinTop | Int |
| Window width | multiwinWidth | Int |
| Window height | multiwinHeight | Int |
| Maximize | multiwinMaximize | Boolean |

In the method for setting the window flag winFlag and the window attribute data, only the winFlag may be set and the window attribute data is not set; and when the winFlag indicates that the Activity is started in the window mode, the window is displayed according to the preset window size and window position. In this mode, the displayed window is located at the same position and has the same size no matter which Activity is started newly.

Alternatively, both the winFlag and the window attribute data are set; and after the intent is received by the Activity, it may be determined whether to start in the window mode according to the value of the winFlag in the intent, and if so, the window is displayed according to the window attribute data. This optional mode in which the window is displayed after the intent is received by the Activity will be described below.

When the window attribute data is determined, for the case that the display mode is preset, the data related to the window display mode may be read from a file androidmanifest.xml of the application to which the Activity belongs and the window attribute data may be set according to the read data.

Optionally, the step of setting the window attribute data may comprise:

setting the window attribute data according to the window attribute of the current window.

Optionally, the step of setting the window attribute data according to the window attribute of the current window may comprise:

First solution: if it is determined that the opened window is used when the Activity is started, then setting the window attribute data to enable the window corresponding to the Activity to have the same size as the current window and completely cover the current window.

Second solution: if it is determined that the new window is required to be opened when the Activity is started, then setting the window attribute data to enable the window corresponding to the Activity to have the same size as the current window and be staggered with the current window by a preset staggered length in the vertical direction and the horizontal direction.

The second solution is illustrated below:

The method in the second solution is based on the consideration of staggering the new window with the current window by a certain distance. For example, the new window is staggered towards the right bottom by the certain distance. An optional calculation method is as follows:

Left=LeftDuration*n

Top=TopDuration*n

Width=WidthDefault

Height=HeightDefault

Where "Left" is the left position of the window, n is the number of opened windows, "Top" is the top position of the window, LeftDuration is the staggered left duration and TopDuration is the staggered top duration. Here, the width of each opened window is the default window width WidthDefault and the height of each opened window is the default window height HeightDefault.

Considering in view of the user operations, since the applications are started from the Launcher in most cases, after one window is started, the window may block a part of the interface of the Launcher, and thus it is not convenient to perform the select operation when other applications are further started. The following optional solutions may be adopted in order to solve the above problem:

First solution: firstly a shortcut menu is set, where the shortcut menu floats on the side of the screen, usually hides and pops out when needed, and the applications required to be started in the window mode are listed in the menu. When there are multiple applications, the menu may roll; addition and/or deletion operations may be performed on the applications in the menu; and finally, there is still an option to enable the user to select the application. Thus, when the user wants to start an application in the window mode, the menu is popped out and the application is selected from the menu for starting instead of selecting it in the launcher or the desktop. The applications started in the menu are all started in the mode where the value of runMode is 3.

Second solution: window hiding and displaying functions are set. When the window hiding operation is selected, all the windows may be hidden, and at this time, the Launcher will not be blocked and it is convenient to start an application, the display window is selected after the application is started, and then the hidden windows will be displayed, so as to facilitate the starting of the application without affecting functions.

The methods according to some embodiments of the disclosure are illustrated by the following respective examples.

During determining the display mode of the Activity, values of runMode and meanings corresponding to respective values may be as shown in Table 2.

TABLE 2

Comparison Table of Values of runMode and Meanings thereof

| runMode | Meaning |
|---|---|
| 1 | Start all the applications in the window mode |
| 2 | Start the application to be started currently in the window mode |
| 3 | Start the application designated by the user in the window mode |
| 4 | Start all the applications in the full-screen mode |

Figure 2:
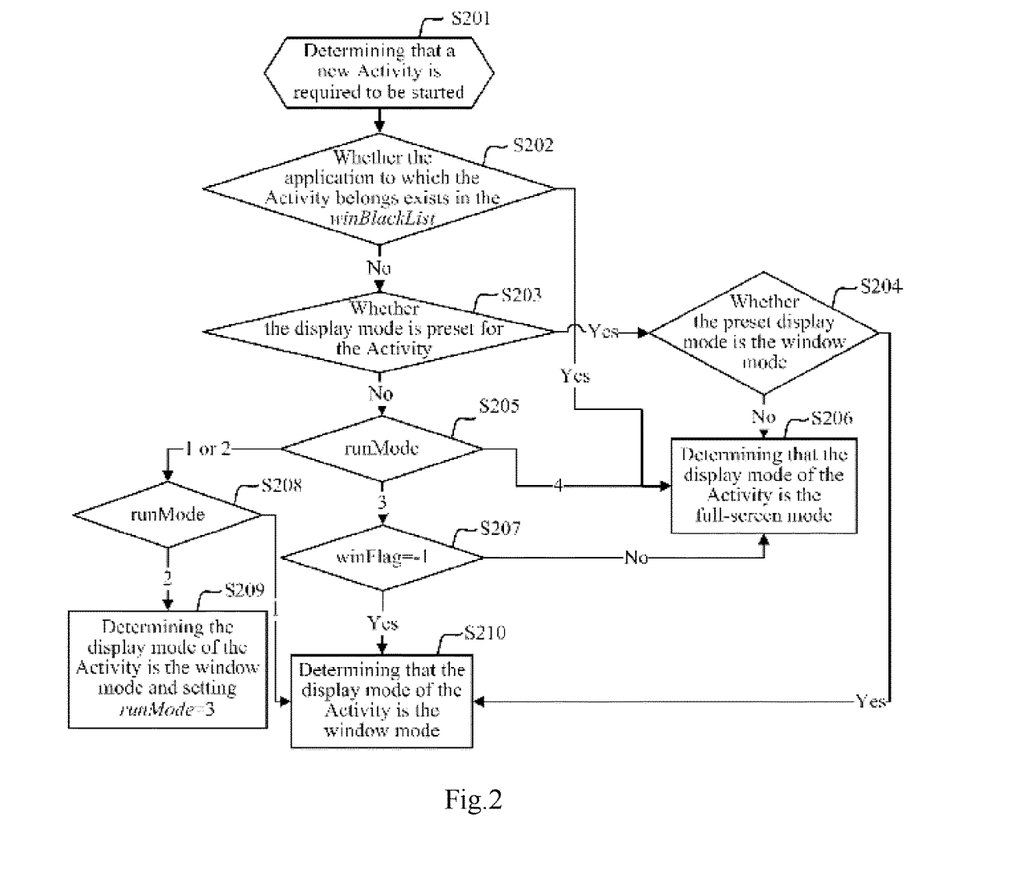

As shown in FIG. 2, the method of determining the display mode of the Activity may comprise the following steps:

Step S201: determining that a new Activity is required to be started;

Step S202: determining whether the application to which the Activity belongs exists in the winBlackList, if so, implementing step S206, and otherwise, implementing step S203;

Step S203: judging whether the display mode is preset for the Activity, if so, implementing step S204, and otherwise, implementing step S205;

Step S204: judging whether the preset display mode is the window mode, if so, implementing step S210, and otherwise, implementing step S206;

Step S205: determining the value of the runMode, where if runMode=1 or 2, implementing step S208, and if runMode=3, implementing step S207, and if runMode=4, implementing step S206;

Step S206: determining that the display mode of the Activity is the full-screen mode;

Step S207: determining the value of the winFlag in the intent for starting the Activity, where when winFlag=−1 (representing that the application to which the Activity belongs is the application designated by the user), implementing step S210, and otherwise, implementing step S206;

Step S208: determining the value of the runMode, where if runMode=1, implementing step S210, and if runMode=2, implementing step S209;

Step S209: determining the display mode of the Activity is the window mode, and setting the display mode of the Activity as the window mode=3; and Step S210: determining that the display mode of the Activity is the window mode.

During determining the window open mode according to startMode and setting winFlag, the values of the startMode and meanings corresponding to respective values may be as shown in Table 3.

TABLE 3

Comparison Table of Values of startMode and Meanings thereof

| StartMode | Meaning |
|---|---|
| 1 | Open the window by taking an Activity as the unit |
| 2 | Open the window by taking an application as the unit |
| 3 | Open the window by taking a user operation as the unit |

Figure 3:
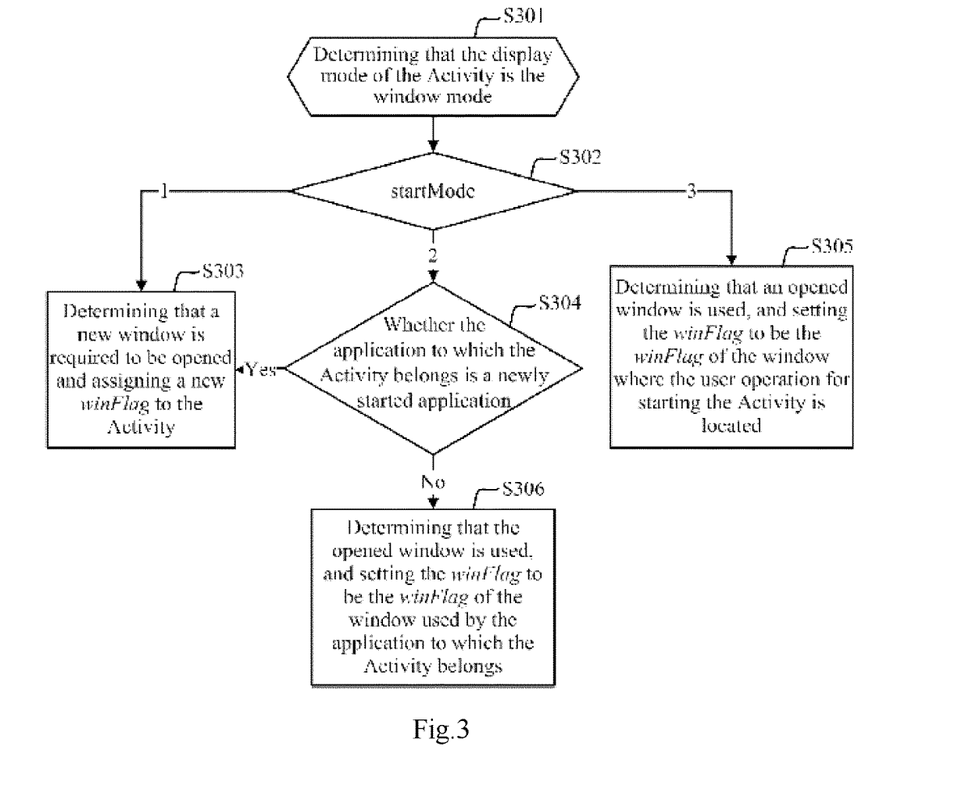

As shown in FIG. 3, the method of determining the window open mode according to startMode and setting winFlag may comprise the following steps:

Step S301: determining that the display mode of the Activity is the window mode;

Step S302: judging the startMode, where if startMode=1 (opening the window by taking an Activity as the unit), implementing step S303, if startMode=2 (opening the window by taking an application as the unit), implementing step S304, and if startMode=3 (opening the window by taking a user operation as the unit), implementing step S305;

Step S303: determining that a new window is required to be opened and assigning a new winFlag to the Activity;

Step S304: judging whether the application to which the Activity belongs is a newly started application, if so, implementing step S303, and otherwise, implementing step S306;

Step S305: determining that an opened window is used, and setting the winFlag to be the winFlag of the window where the user operation for starting the Activity is located; and Step S306: determining that the opened window is used, and setting the winFlag to be the winFlag of the window used by the application to which the Activity belongs.

Figure 4:
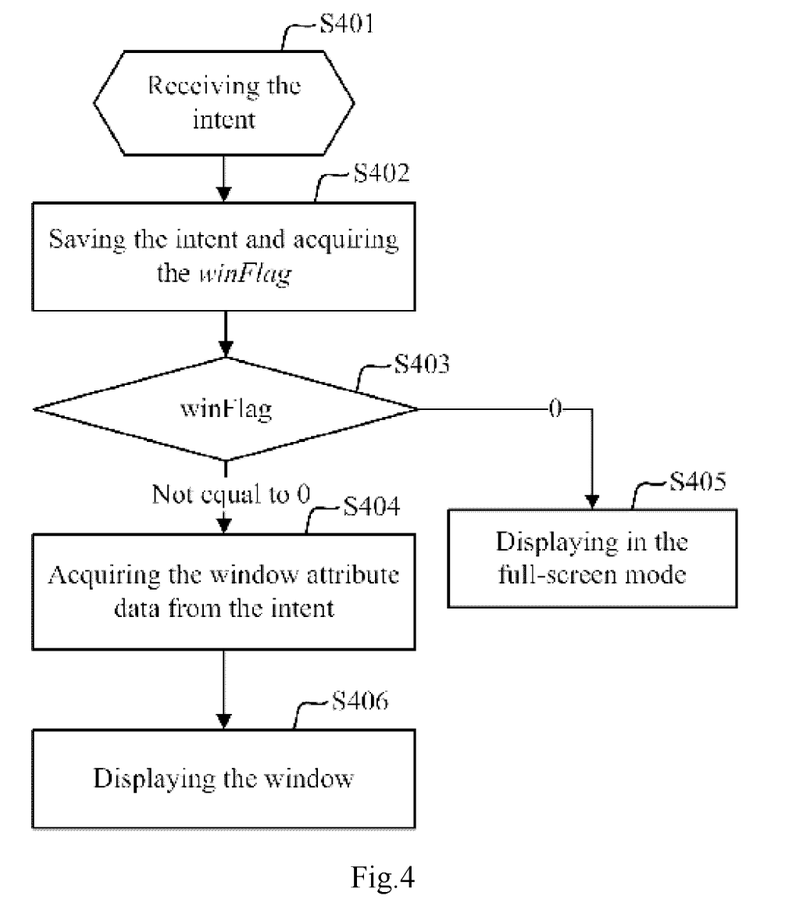

During displaying the window according to winFlag and window attribute data in the corresponding intent by the Activity, when winFlag=0, it represents that the Activity is started in the full-screen mode.

As shown in FIG. 4, the method of displaying the window according to winFlag and window attribute data may comprise the following steps:

Step S401: receiving the intent by the Activity;

Step S402: saving the intent and acquiring the value of the winFlag by the Activity;

Step S403: determining the value of the winFlag, where if winFlag=0, implementing step S405, and otherwise, implementing step S404;

Step S404: acquiring the window attribute data from the intent;

Step S405: displaying in the full-screen mode; and

Step S406: displaying the window.

Figure 5:
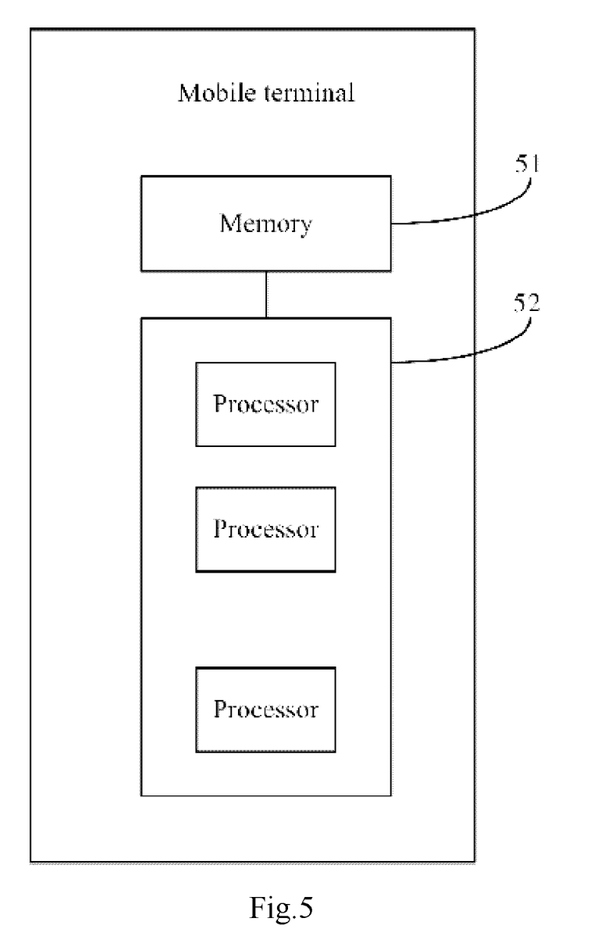

FIG. 5 is a structural schematic diagram of a mobile terminal according to an embodiment of the disclosure. As shown in FIG. 5, the mobile terminal may comprise: a memory 51; and one or more processors 52.

In this case, the memory 51 may store computer-readable program codes, and the one or more processors 52 may be used to execute the computer-readable program codes to implement:

determining a display mode of a new Activity after determining that the new Activity is required to be started; and setting a window flag for starting the Activity according to the determined display mode so as to start the Activity in the display mode indicated by the window flag.

Here the display mode may comprise the window mode and the full-screen mode.

Optionally, determining the display mode of the Activity may comprise:

determining whether the display mode is preset for the Activity; if so and the preset display mode is the window mode, then determining that the display mode of the Activity is the window mode;

otherwise, determining current run mode indication information; and determining the display mode of the Activity according to the current run mode indication information, where the current run mode indication information may be used for indicating display modes of respective applications in runtime.

Optionally, determining the display mode of the Activity according to the current run mode indication information may comprise:

determining that the display mode of the Activity is the window mode when one of following conditions is met:

the current run mode indication information indicates that an application designated by a user is started in the window mode, and an application to which the Activity belongs is the application designated by the user;

the current run mode indication information indicates that all applications are started in the window mode;

the current run mode indication information indicates that an application to be started currently is started in the window mode, and the application to which the Activity belongs is the application to be started currently.

Optionally, determining the display mode of the Activity according to the current run mode indication information may further comprise:

if the current run mode indication information indicates that the application designated by the user is started in the window mode, and the application to which the Activity belongs is not the application designated by the user, then determining that the display mode of the Activity is the full-screen mode;

if the current run mode indication information indicates that the application to be started currently is started in the window mode, and the application to which the Activity belongs is not the application to be started currently, then determining that the display mode of the Activity is the full-screen mode;

if the current run mode indication information indicates that all the applications are started in the full-screen mode, then determining that the display mode of the Activity is the full-screen mode.

Optionally, if the current run mode indication information indicates that the application to be started currently is started in the window mode, then the one or more processors 52 may be further used to execute the computer-readable program codes to implement: setting the current run mode indication information to indicate that the application designated by the user is started in the window mode after determining the display mode of the Activity according to the current run mode indication information.

Optionally, if the determined display mode is the full-screen mode, then setting the window flag may comprise: setting the window flag corresponding to the Activity to be a first window flag, where the first window flag may be a preset window flag representing that an Activity is started in the full-screen mode.

Optionally, if the determined display mode is the window mode, then the one or more processors 52 may be further used to execute the computer-readable program codes to implement: determining whether a new window is required to be opened when the Activity is started after determining the display mode of the Activity and before setting the window flag; if so, setting the window flag may comprise: assigning a window flag corresponding to the new window to the Activity; otherwise, setting the window flag may comprise: setting the window flag to be a window flag corresponding to an opened window, where the window flag may meet: the window flag corresponds to only one window and is not identical to the first window flag.

Optionally, determining whether the new window is required to be opened when the Activity is started may comprise:
determining window open mode indication information.

Optionally, when any one of first conditions is met, it is determined that the new window is required to be opened, where the first conditions may comprise:
the window open mode indication information indicates that a window is opened by taking an Activity as a unit;
the window open mode indication information indicates that a window is opened by taking an application as the unit, and the application to which the Activity belongs is a newly started application.

Optionally, when any one of second conditions is met, it is determined that the opened window is used, where the second conditions may comprise:
the window open mode indication information indicates that a window is opened by taking a user operation as the unit;
the window open mode indication information indicates that a window is opened by taking an application as the unit.

Optionally, if the window open mode indication information indicates that the window is opened by taking the user operation as the unit, then setting the window flag may comprise: setting the window flag to be a window flag corresponding to a window where a user operation for starting the Activity is located.

Optionally, if the window open mode indication information indicates that the window is opened by taking the application as the unit and the application to which the Activity belongs is a started application, then setting the window flag may comprise: setting the window flag to be a window flag corresponding to a window used by the application to which the Activity belongs.

Optionally, the one or more processors 52 may be further used to execute the computer-readable program codes to implement:
setting window attribute data in an intent for starting the Activity to enable the Activity to display a window according to the window attribute data after determining that the display mode of the Activity is the window mode.

Figure 6:
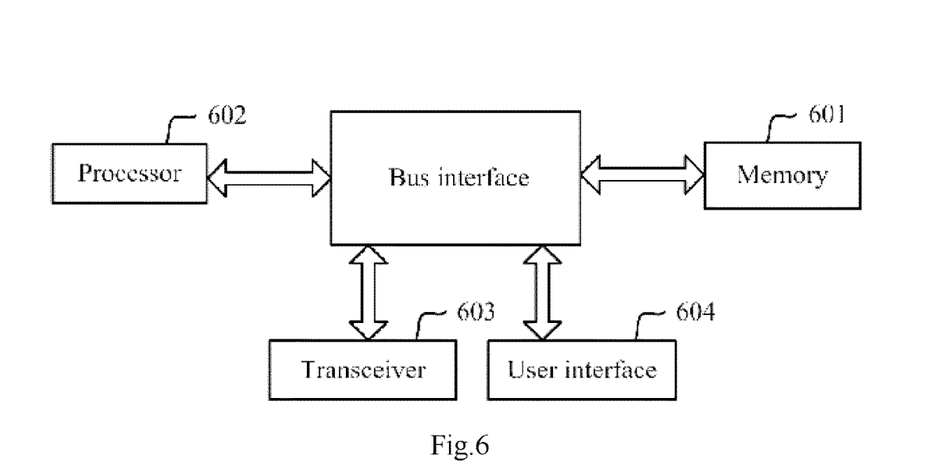

FIG. 6 is a structural schematic diagram of an Android terminal according to an embodiment of the disclosure. As shown in FIG. 6, the Android terminal may comprise:
a memory 601 used for storing a program for starting the Activity; and
a processor 602 used for executing the program stored in the memory 601 to implement: determining the display mode of a new Activity after determining that the new Activity is required to be started; and setting the window flag in the message transfer object intent for starting the Activity according to the determined display mode so as to start the Activity in the display mode indicated by the window flag, where the display mode may comprise the window mode and the full-screen mode.

As shown in FIG. 6, the bus architecture may comprise any number of interconnected buses and bridges, and specifically, the bus architecture is formed by linking various circuits of one or more processors represented by the processor 602 and a memory represented by the memory 601. The bus architecture may also link various other circuits, such as a peripheral equipment, a voltage stabilizer, a power management circuit and the like, which are all well known in the art and will not be further described herein. The bus interface provides an interface. A transceiver 603 may comprise multiple elements, namely transmitters and receivers, and provides units for communicating with other various devices on the transmission media. For different user equipment, the user interface 604 may also be the interface which may be externally and internally connected with the required equipment, and the connected equipment comprises but is not limited to a keypad, a display device, a loudspeaker, a microphone, a joystick and the like.

Optionally, the processor 602 may be used for:
determining whether the display mode is preset for the Activity;
if so and the preset display mode is the window mode, then determining that the display mode of the Activity is the window mode;
otherwise, determining current run mode indication information; and determining the display mode of the Activity according to the current run mode indication information, where the current run mode indication information may be used for indicating display modes of respective applications in runtime.

Optionally, the processor 602 may be used for:
determining that the display mode of the Activity is the window mode when one of following conditions is met:
the current run mode indication information indicates that an application designated by a user is started in the window mode, and an application to which the Activity belongs is the application designated by the user;
the current run mode indication information indicates that all applications are started in the window mode;
the current run mode indication information indicates that an application to be started currently is started in the window mode, and the application to which the Activity belongs is the application to be started currently.

Optionally, the processor 602 may further be used for:
if the current run mode indication information indicates that the application designated by the user is started in the window mode, and the application to which the Activity belongs is not the application designated by the user, then determining that the display mode of the Activity is the full-screen mode;
if the current run mode indication information indicates that the application to be started currently is started in the window mode, and the application to which the Activity belongs is not the application to be started currently, then determining that the display mode of the Activity is the full-screen mode;
if the current run mode indication information indicates that all the applications are started in the full-screen mode, then determining that the display mode of the Activity is the full-screen mode.

Optionally, the processor 602 may further be used for:

if the current run mode indication information indicates that the application to be started currently is started in the window mode, then setting the current run mode indication information to indicate that the application designated by the user is started in the window mode after determining the display mode of the Activity according to the current run mode indication information.

Optionally, if the determined display mode is the full-screen mode, then the processor 602 may be used for: setting the window flag corresponding to the Activity to be a first window flag, where the first window flag may be a preset window flag representing that an Activity is started in the full-screen mode.

Optionally, if the determined display mode is the window mode, then the processor 602 may be used for: determining whether a new window is required to be opened when the Activity is started after determining the display mode of the Activity and before setting the window flag; if so, assigning a window flag corresponding to the new window to the Activity; otherwise, setting the window flag to be a window flag corresponding to an opened window, where the window flag may meet: the window flag corresponds to only one window and is not identical to the first window flag.

Optionally, the processor 602 may be used for:

determining window open mode indication information.

Optionally, when any one of first conditions is met, it is determined that the new window is required to be opened, where the first conditions may comprise:

the window open mode indication information indicates that a window is opened by taking an Activity as a unit;

the window open mode indication information indicates that a window is opened by taking an application as the unit, and the application to which the Activity belongs is a newly started application.

Optionally, when any one of second conditions is met, it is determined that the opened window is used, where the second conditions may comprise:

the window open mode indication information indicates that a window is opened by taking a user operation as the unit;

the window open mode indication information indicates that a window is opened by taking an application as the unit.

Optionally, the processor 602 may be used for:

if the window open mode indication information indicates that the window is opened by taking the user operation as the unit, then setting the window flag to be a window flag corresponding to a window where a user operation for starting the Activity is located;

if the window open mode indication information indicates that the window is opened by taking the application as the unit and the application to which the Activity belongs is a started application, then setting the window flag to be a window flag corresponding to a window used by the application to which the Activity belongs.

Optionally, the processor 602 may further be used for:

setting window attribute data in an intent for starting the Activity to enable the Activity to display a window according to the window attribute data after determining that the display mode of the Activity is the window mode.

In addition, an embodiment of the disclosure provides a computer-readable storage medium, where the computer-readable storage medium may be the computer-readable storage medium contained in the memory in the embodiment, or may be the computer-readable storage medium which exists alone and is not assembled into the terminal. The computer-readable storage medium stores one or more programs (in some embodiments, the computer-readable storage medium may be one or more magnetic disc storage devices, a flash memory device or other non-volatile solid-state storage devices, a CD-ROM, an optical memory and the like), where the one or more programs are executed by one or more processors to implement the method for starting the Activity of the mobile terminal described in any one of the above embodiments.

Those skilled in the art shall appreciate that the embodiments of the disclosure may be embodied as a method, a system or a computer program product. Therefore the disclosure may be embodied in the form of an all-hardware embodiment, an all-software embodiment or an embodiment of software and hardware in combination. Furthermore, the disclosure may be embodied in the form of a computer program product embodied in one or more computer useable storage mediums (including but not limited to a disk memory, a CD-ROM, an optical memory, etc.) in which computer useable program codes are contained.

The disclosure has been described with reference to flow charts and/or block diagrams of the method, the device (system) and the computer program product according to the embodiments of the disclosure. It shall be appreciated that respective flows and/or blocks in the flow charts and/or the block diagrams and combinations of the flows and/or the blocks in the flow charts and/or the block diagrams may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions may also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the disclosure have been described, those skilled in the art benefiting from the underlying inventive concepts may make additional modifications and variations to these embodiments. Therefore the appended claims are intended to be construed as encompassing the preferred embodiments and the modifications and variations coming into the scope of the disclosure.

Evidently those skilled in the art may make various modifications and variations to the disclosure without departing from the spirit and scope of the disclosure. Thus the disclosure is also intended to encompass these modifications and variations thereto so long as these modifications and variations come into the scope of the claims appended to the disclosure and their equivalents.

What is claimed is:

1. A method for starting an Activity of a mobile terminal, comprising:
 determining whether a display mode is preset for a new Activity after determining that the new Activity is required to be started, wherein the display mode comprising a window mode and a full-screen mode; and
 if so and the preset display mode is the window mode, then determining that the display mode of the Activity is the window mode;
 otherwise, determining current run mode indication information; determining a display mode of respective applications according to the current run mode indication information, and determining the display mode of the Activity according to a relationship between the Activity and the respective applications;
 setting a window flag for starting the Activity according to the determined display mode so as to start the Activity in the display mode indicated by the window flag;
 wherein determining a display mode of respective applications according to the current run mode indication information, and determining the display mode of the Activity according to a relationship between the Activity and the respective applications comprises:
 determining that the display mode of the Activity is the window mode when one of following conditions is met:
 the current run mode indication information indicates that an application designated by a user is started in the window mode, and an application to which the Activity belongs is the application designated by the user;
 the current run mode indication information indicates that all applications are started in the window mode;
 the current run mode indication information indicates that an application to be started currently is started in the window mode, and the application to which the Activity belongs is the application to be started currently;
 wherein determining the display mode of the Activity according to the current run mode indication information further comprises:
 if the current run mode indication information indicates that the application designated by the user is started in the window mode, and the application to which the Activity belongs is not the application designated by the user, then determining that the display mode of the Activity is the full-screen mode;
 if the current run mode indication information indicates that the application to be started currently is started in the window mode, and the application to which the Activity belongs is not the application to be started currently, then determining that the display mode of the Activity is the full-screen mode;
 if the current run mode indication information indicates that all the applications are started in the full-screen mode, then determining that the display mode of the Activity is the full-screen mode.

2. The method according to claim 1, wherein if the current run mode indication information indicates that the application to be started currently is started in the window mode, then after determining the display mode of the Activity according to the current run mode indication information, the method further comprises:
 setting the current run mode indication information to indicate that the application designated by the user is started in the window mode.

3. The method according to claim 1, wherein:
 if the determined display mode is the full-screen mode, then setting the window flag comprises:
 setting the window flag corresponding to the Activity to be a first window flag, wherein the first window flag is a preset window flag representing that an Activity is started in the full-screen mode;
 if the determined display mode is the window mode, then after determining the display mode of the Activity and before setting the window flag, the method further comprises:
 determining whether a new window is required to be opened when the Activity is started; if so, setting the window flag comprises: assigning a window flag corresponding to the new window to the Activity; otherwise, setting the window flag comprises: setting the window flag to be a window flag corresponding to an opened window, wherein the window flag meets: the window flag corresponds to only one window and is not identical to the first window flag.

4. The method according to claim 3, wherein determining whether the new window is required to be opened when the Activity is started comprises:
 determining window open mode indication information;
 when any one of first conditions is met, determining that the new window is required to be opened, wherein the first conditions comprise:
 the window open mode indication information indicates that a window is opened for an Activity;
 the window open mode indication information indicates that a window is opened for an application, and the application to which the Activity belongs is a newly started application;
 when any one of second conditions is met, determining that the opened window is used, wherein the second conditions comprise:
 the window open mode indication information indicates that a window is opened for a user operation, and respective Activities started by all the user operations in one window correspond to the window;
 the window open mode indication information indicates that a window is opened for an application, and all the Activities of the application correspond to the same window.

5. The method according to claim 4, wherein:
 if the window open mode indication information indicates that the window is opened for the user operation, then setting the window flag comprises: setting the window flag to be a window flag corresponding to a window where a user operation for starting the Activity is located;
 if the window open mode indication information indicates that the window is opened for the application and the application to which the Activity belongs is a started application, then setting the window flag comprises: setting the window flag to be a window flag corresponding to a window used by the application to which the Activity belongs.

6. The method according to claim 1, wherein after determining that the display mode of the Activity is the window mode, the method further comprises:
 setting window attribute data for starting the Activity to enable the Activity to display a window according to the window attribute data.

7. A mobile terminal, comprising:
a memory; and
one or more processors,
wherein the memory stores computer-readable program codes, and the one or more processors are used to execute the computer-readable program codes to implement:
determining whether a display mode is preset for a new Activity after determining that the new Activity is required to be started, wherein the display mode comprising a window mode and a full-screen mode; and
if so and the preset display mode is the window mode, then determining that the display mode of the Activity is the window mode;
otherwise, determining current run mode indication information; determining a display mode of respective applications according to the current run mode indication information, and determining the display mode of the Activity according to a relationship between the Activity and the respective applications;
setting a window flag for starting the Activity according to the determined display mode so as to start the Activity in the display mode indicated by the window flag;
wherein determining a display mode of respective applications according to the current run mode indication information, and determining the display mode of the Activity according to a relationship between the Activity and the respective applications comprises:
determining that the display mode of the Activity is the window mode when one of following conditions is met:
the current run mode indication information indicates that an application designated by a user is started in the window mode, and an application to which the Activity belongs is the application designated by the user;
the current run mode indication information indicates that all applications are started in the window mode;
the current run mode indication information indicates that an application to be started currently is started in the window mode, and the application to which the Activity belongs is the application to be started currently;
wherein determining the display mode of the Activity according to the current run mode indication information further comprises:
if the current run mode indication information indicates that the application designated by the user is started in the window mode, and the application to which the Activity belongs is not the application designated by the user, then determining that the display mode of the Activity is the full-screen mode;
if the current run mode indication information indicates that the application to be started currently is started in the window mode, and the application to which the Activity belongs is not the application to be started currently, then determining that the display mode of the Activity is the full-screen mode;
if the current run mode indication information indicates that all the applications are started in the full-screen mode, then determining that the display mode of the Activity is the full-screen mode.

8. The mobile terminal according to claim 7, wherein if the current run mode indication information indicates that the application to be started currently is started in the window mode, then the one or more processors are further used to execute the computer-readable program codes to implement:

setting the current run mode indication information to indicate that the application designated by the user is started in the window mode after determining the display mode of the Activity according to the current run mode indication information.

9. The mobile terminal according to claim 7, wherein:
if the determined display mode is the full-screen mode, then setting the window flag comprises:
setting the window flag corresponding to the Activity to be a first window flag, wherein the first window flag is a preset window flag representing that an Activity is started in the full-screen mode;
if the determined display mode is the window mode, then the one or more processors are further used to execute the computer-readable program codes to implement:
determining whether a new window is required to be opened when the Activity is started after determining the display mode of the Activity and before setting the window flag; if so, setting the window flag comprises: assigning a window flag corresponding to the new window to the Activity; otherwise, setting the window flag comprises: setting the window flag to be a window flag corresponding to an opened window, wherein the window flag meets: the window flag corresponds to only one window and is not identical to the first window flag.

10. The mobile terminal according to claim 9, wherein determining whether the new window is required to be opened when the Activity is started comprises:
determining window open mode indication information;
when any one of first conditions is met, determining that the new window is required to be opened, wherein the first conditions comprise:
the window open mode indication information indicates that a window is opened for an Activity;
the window open mode indication information indicates that a window is opened for an application, and the application to which the Activity belongs is a newly started application;
when any one of second conditions is met, determining that the opened window is used, wherein the second conditions comprise:
the window open mode indication information indicates that a window is opened for a user operation, and respective Activities started by all the user operations in one window correspond to the window;
the window open mode indication information indicates that a window is opened for an application, and all the Activities of the application correspond to the same window.

11. The mobile terminal according to claim 10, wherein:
if the window open mode indication information indicates that the window is opened for the user operation, then setting the window flag comprises: setting the window flag to be a window flag corresponding to a window where a user operation for starting the Activity is located;
if the window open mode indication information indicates that the window is opened for the application and the application to which the Activity belongs is a started application, then setting the window flag comprises: setting the window flag to be a window flag corresponding to a window used by the application to which the Activity belongs.

12. The mobile terminal according to claim 7, wherein the one or more processors are further used to execute the computer-readable program codes to implement:

setting window attribute data in an intent for starting the Activity to enable the Activity to display a window according to the window attribute data after determining that the display mode of the Activity is the window mode.

13. A non-transitory storage medium storing computer-readable program codes, wherein the computer-readable program codes are executed by one or more processors to implement:

determining whether a display mode is preset for a new Activity after determining that the new Activity is required to be started, wherein the display mode comprising a window mode and a full-screen mode; and if so and the preset display mode is the window mode, then determining that the display mode of the Activity is the window mode;

otherwise, determining current run mode indication information; determining a display mode of respective applications according to the current run mode indication information, and determining the display mode of the Activity according to a relationship between the Activity and the respective applications;

setting a window flag for starting the Activity according to the determined display mode so as to start the Activity in the display mode indicated by the window flag;

wherein determining a display mode of respective applications according to the current run mode indication information, and determining the display mode of the Activity according to a relationship between the Activity and the respective applications comprises:

determining that the display mode of the Activity is the window mode when one of following conditions is met:

the current run mode indication information indicates that an application designated by a user is started in the window mode, and an application to which the Activity belongs is the application designated by the user;

the current run mode indication information indicates that all applications are started in the window mode;

the current run mode indication information indicates that an application to be started currently is started in the window mode, and the application to which the Activity belongs is the application to be started currently;

wherein determining the display mode of the Activity according to the current run mode indication information further comprises:

if the current run mode indication information indicates that the application designated by the user is started in the window mode, and the application to which the Activity belongs is not the application designated by the user, then determining that the display mode of the Activity is the full-screen mode;

if the current run mode indication information indicates that the application to be started currently is started in the window mode, and the application to which the Activity belongs is not the application to be started currently, then determining that the display mode of the Activity is the full-screen mode;

if the current run mode indication information indicates that all the applications are started in the full-screen mode, then determining that the display mode of the Activity is the full-screen mode.

* * * * *